United States Patent [19]

Rojey et al.

[11] 4,311,019

[45] Jan. 19, 1982

[54] PROCESS FOR PRODUCING COLD AND/OR HEAT WITH USE OF AN ABSORPTION CYCLE

[75] Inventors: Alexandre Rojey, Garches; Georges Cohen, Le Pecq, both of France

[73] Assignee: Institut Francais du Petrole, Rueil-Malmaison, France

[21] Appl. No.: 141,248

[22] Filed: Apr. 17, 1980

[30] Foreign Application Priority Data

Apr. 17, 1979 [FR] France .................................. 79 09836

[51] Int. Cl.³ ........................ F25B 15/00; F25B 27/02; F25B 13/00
[52] U.S. Cl. ...................................... 62/101; 62/114; 62/238.3; 62/324.2
[58] Field of Search .................... 62/101, 324.2, 238.3, 62/114

[56] References Cited

U.S. PATENT DOCUMENTS

| | | | |
|---|---|---|---|
| 2,182,098 | 12/1939 | Sellew | 62/324.2 |
| 2,182,453 | 12/1939 | Sellew | 62/238.3 |
| 3,817,050 | 6/1974 | Alexander et al. | 62/101 |
| 4,102,388 | 7/1978 | Blytas | 62/101 X |

FOREIGN PATENT DOCUMENTS

2321098 12/1977 France .................................. 62/101

*Primary Examiner*—Lloyd L. King
*Attorney, Agent, or Firm*—Millen & White

[57] ABSTRACT

Cold and/or heat are produced by a process operated according to the absorption technique and which comprises at least two successive absorption steps of the solute vapor in a solvent. At least one part of the heat evolved in the first absorption step is used to partially vaporize the solution recovered from the second absorption step, said second absorption step being operated at a lower temperature than the first absorption step. The solution recovered from said second absorption step is brought to higher pressure and partially vaporized with use of the heat evolved in the first absorption step. The resultant solution is then desorbed in a countercurrent contact zone wherein the solution is contacted with a vapor phase generated by heating of this solution.

24 Claims, 5 Drawing Figures

PROCESS FOR PRODUCING COLD AND/OR HEAT WITH USE OF AN ABSORPTION CYCLE

BACKGROUND OF THE INVENTION

The object of the present invention is to improve the performance of the processes for producing cold and/or heat by means of an absorption cycle. The principle of an absorption refrigerator is well known. The absorption cycle for producing cold basically comprises the following steps:

Cold is generated by vaporizing at a low pressure, a refrigeration fluid initially in the liquid form. This vaporized refrigeration fluid is then absorbed by a solvent phase while transmitting heat to an external medium. The resultant solution is heated at a higher pressure and a vapor phase of high refrigeration fluid content is generated. This vapor phase is condensed while transmitting heat to the external medium. A fraction of the resultant condensate may be fed back as reflux and contacted with the vapor phase in a rectifying zone in order to suppress the stripping of solvent and to obtain a practically pure condensed phase. The resultant condensed phase is expanded and vaporized again to generate cold. A cycle of this type commonly uses ammonia as the refrigeration fluid, and water as the solvent phase; however other solute-solvent pairs are also known.

Figure 1A:
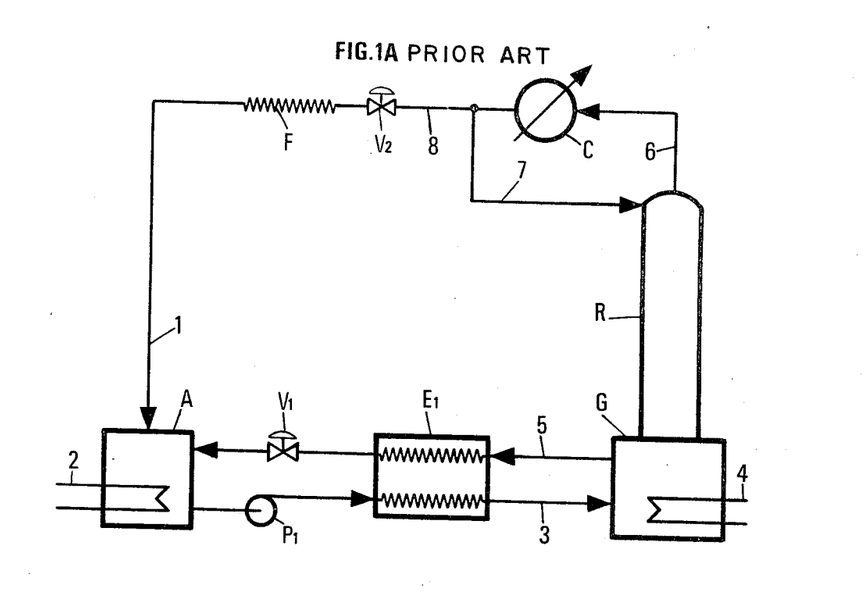
FIG. 1A is a schematic diagram of a prior art absorption type refrigerator/heat pump system.

The operation of a prior art system of this type is illustrated by the basic diagram of FIG. 1A. The refrigeration fluid is vaporized in the exchanger F while producing cold. The resultant vapor is fed through line 1 to the enclosure A where it is absorbed by a lean solution and the absorption heat is removed by an external fluid 2. A lean solution is intended to mean a solution having a relatively low concentration of the refrigeration fluid, and a concentrated solution is intended to mean a solution having a relatively high concentration of the refrigeration fluid. The concentrated solution obtained by absorption in the enclosure A is fed through the pump $P_1$, the exchanger $E_1$ and the duct 3 to the enclosure G. The enclosure G is heated with an external fluid 4 and a vapor phase is thus generated, which passes into the rectification zone R. The lean solution discharged from the enclosure G is passed through the duct 5 and the exchanger $E_1$ where it re-heats the concentrated solution fed to the enclosure G; it is expanded through the valve $V_1$ and fed to the enclosure A. The vapor discharged from the rectification zone R through the line 6 is condensed in the cooler C wherein it is cooled with an external fluid. A fraction of the condensed phase is fed back through the duct 7 to the rectification zone R as reflux and the remainder (line 8) is expanded through the valve $V_2$ and vaporized in the exchanger F.

A device of this type may also work as a heat pump. In that case, heat generated in the absorption and condensation step is produced at a higher temperature than room temperature and can be used as heating means. The amount of heat thus produced is higher than the amount of heat consumed for generating the vapor phase. As a matter of fact, it also comprises the heat "pumped" from the exterior when vaporizing the refrigeration fluid in the exchanger F.

The absorption refrigerators are advantageous any time an unexpensive heat source is available, for example, excess steam in an industrial plant, or associated gas in the case of an oil field. However, plants of this type require, even for producing cold at a moderately low temperature level, for example at 0° C., relatively large heat amounts. This heat consumption also results in an increase of the investments, particularly by requiring expensive condensation and heating exchangers.

SUMMARY OF THE INVENTION

It has been found, and this is an object of the present invention, that the performances of these plants may be largely improved by generating a part of the vapor phase produced in the desorption step with use of a part of the heat produced in the absorption step.

Such heat recovery is impossible in the case of the known processes operated according to the basic schemes of the FIG. 1a. As a matter of fact, the pressure at which the desorption is effected being higher than the pressure at which the absorption is effected, the temperature necessary to desorb the solution obtained in the absorption step is necessarily higher than the temperature obtained in the absorption step. The improved process according to the invention for producing cold and/or heat by means of an absorption cycle is characterized in that it comprises at least two successive absorption stages at decreasing levels of temperature, the heat produced in the first stage being used to vaporize at least partly the solution obtained in the second stage, and at least one desorption stage in which the solution recovered from the absorption stages, and which has not been vaporized by the heat delivered from the first absorption stage, is desorbed in a counter-current contact zone where the solution is contacted with a vapor phase generated by heating of the said solution with a supply of external heat, the solvent phase recovered from this contact being at least partly recycled to the first absorption stage and the vapor phase of solute from the same contact being condensed and then expanded and fed back at least partly to the first absorption stage.

According to a specific embodiment, the process comprises the following steps of:

(a) contacting at least a part of a gas phase constituting the solute with at least a part of a liquid phase constituting the solvent, in a first absorption stage with heat release in a first temperature range $I_1$, and recovering a solution $S_1$, (b) contacting at least a part of the solution $S_1$ with a residual portion of a gas phase of solute in at least one second absorption stage, in a second temperature range $I_2$ at least partly lower than the range $I_1$, transferring the liberated heat to an external fluid and recovering a solution $S_2$, (c) compressing the solution $S_2$, (d) applying to at least one part of the compressed solution $S_2$ at least a part of the heat released in the step (a), which results in the partial vaporization of this solution, and recovering a liquid-vapor mixture, (e) fractionating the liquid-vapor mixture obtained in the step (d), in a desorption zone operated by counter-current of said liquid with the vapor generated by heating of said liquid by means of an external heat source, and separately recovering a gas phase of increased solute content and a liquid phase of decreased solute content, (f) condensing the gas phase recovered in step (e), transferring condensation heat to an external fluid and recovering a condensate, (g) expanding the condensate in at least one step and vaporizing it while producing cold and transmitting said cold to an external fluid, collecting at least one gas phase of solute and feeding back at least a part of the latter to the step (a), and (h) expanding the liquid phase of low solute content, obtained in step (e) and feeding it back at least in part to the step (a) to be contacted one more with at least a part of the gas phase from the step (g).

As a preferred embodiment, a part only of the gas phase of solute is contacted with the solvent in the step (a) and the remainder of the solute is fed to step (b) for contact with the solution $S_1$.

According to another embodiment, the whole of the gas phase of solute is fed back to the step (a), but only a part of this gas phase is dissolved and at least a part of the gas/liquid effluent discharged from the step (a) is fed back to the step (b).

BRIEF DESCRIPTION OF THE DRAWINGS

The invention will be described in greater detail with reference to the accompanying drawings in which.

Figure 1B:
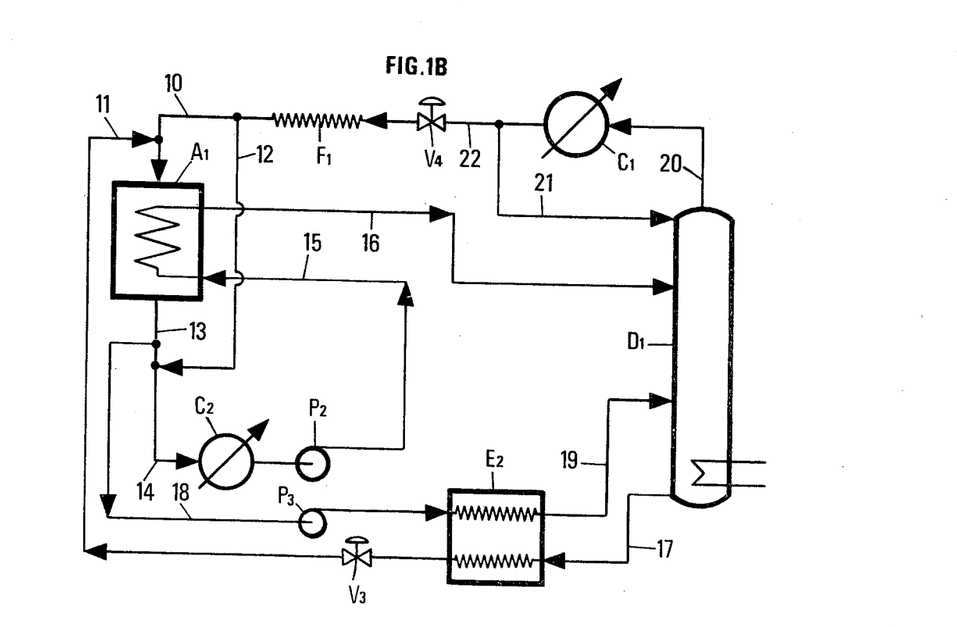
FIG. 1B is a schematic diagram of a first embodiment of the absorption refrigerator/heat pump system of the invention illustrating wherein the solution from the second absorption is partially vaporized by transfer of heat from the first absorption.
Figure 2:
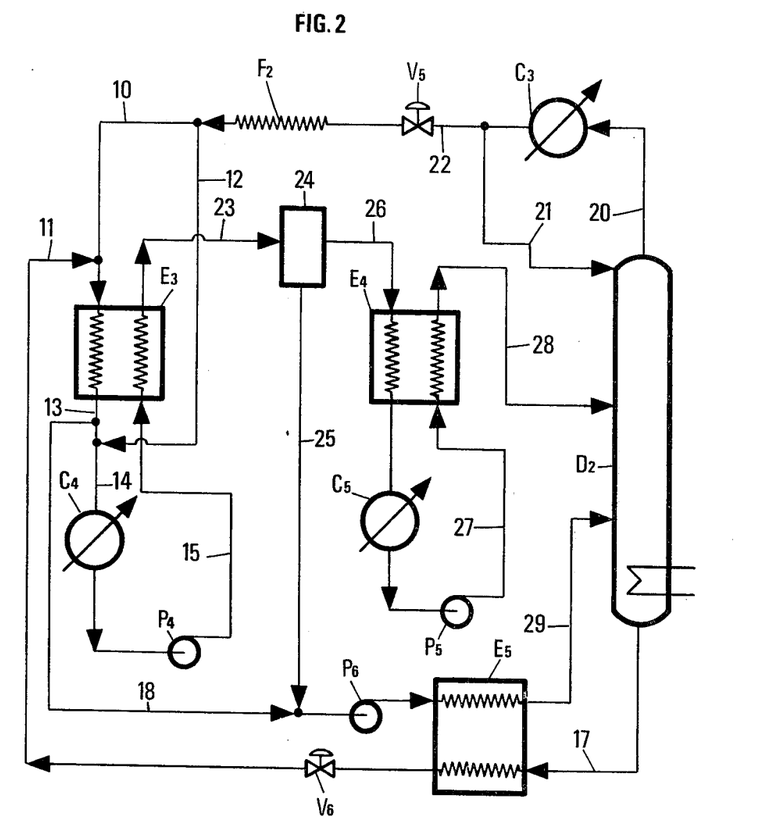
FIG. 2 is a schematic diagram of a second embodiment of the invention of FIG. 1B wherein the solution from the second absorption, after being partially vaporized, is fractionated.
Figure 3:
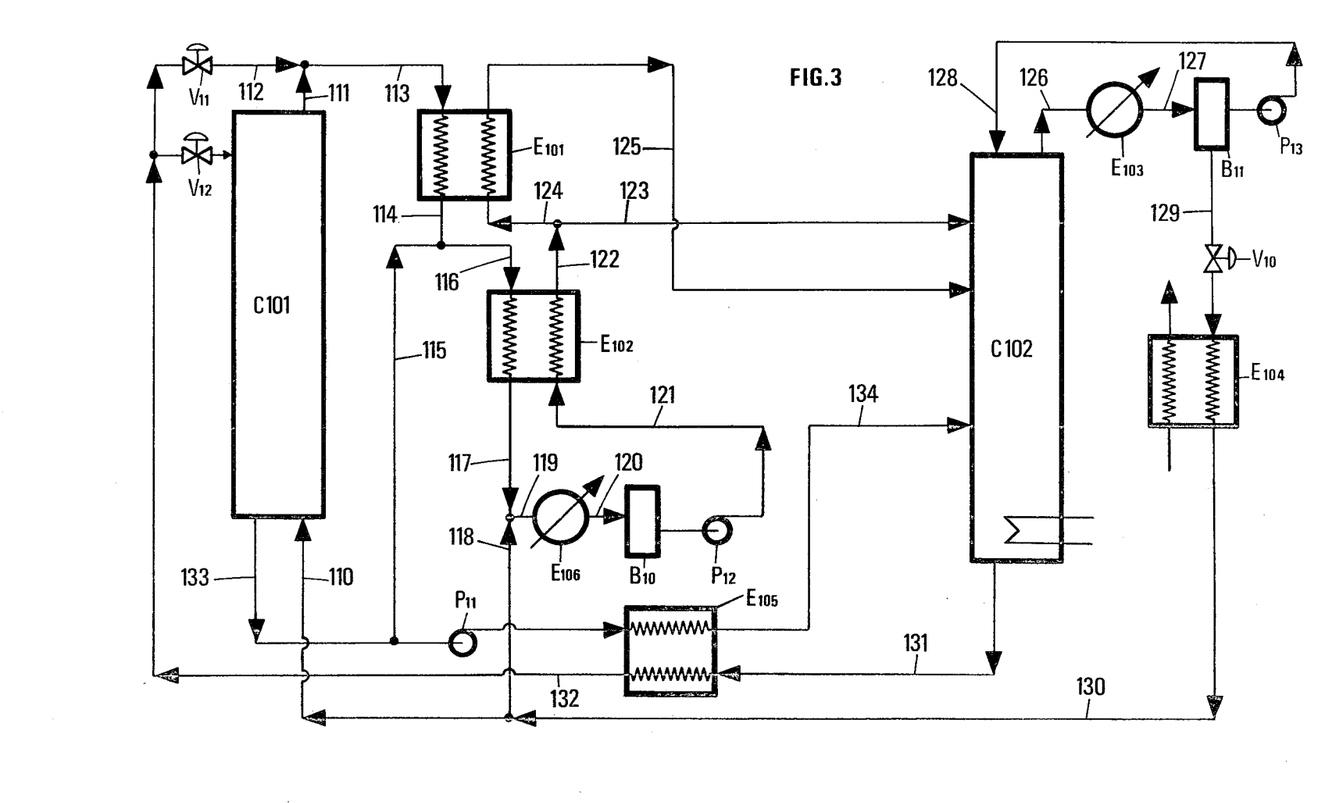
FIG. 3 is a schematic diagram of another embodiment of the invention wherein the desorbed solution is supplied partially to the first absorption step and partially to the second absorption step.
Figure 4:
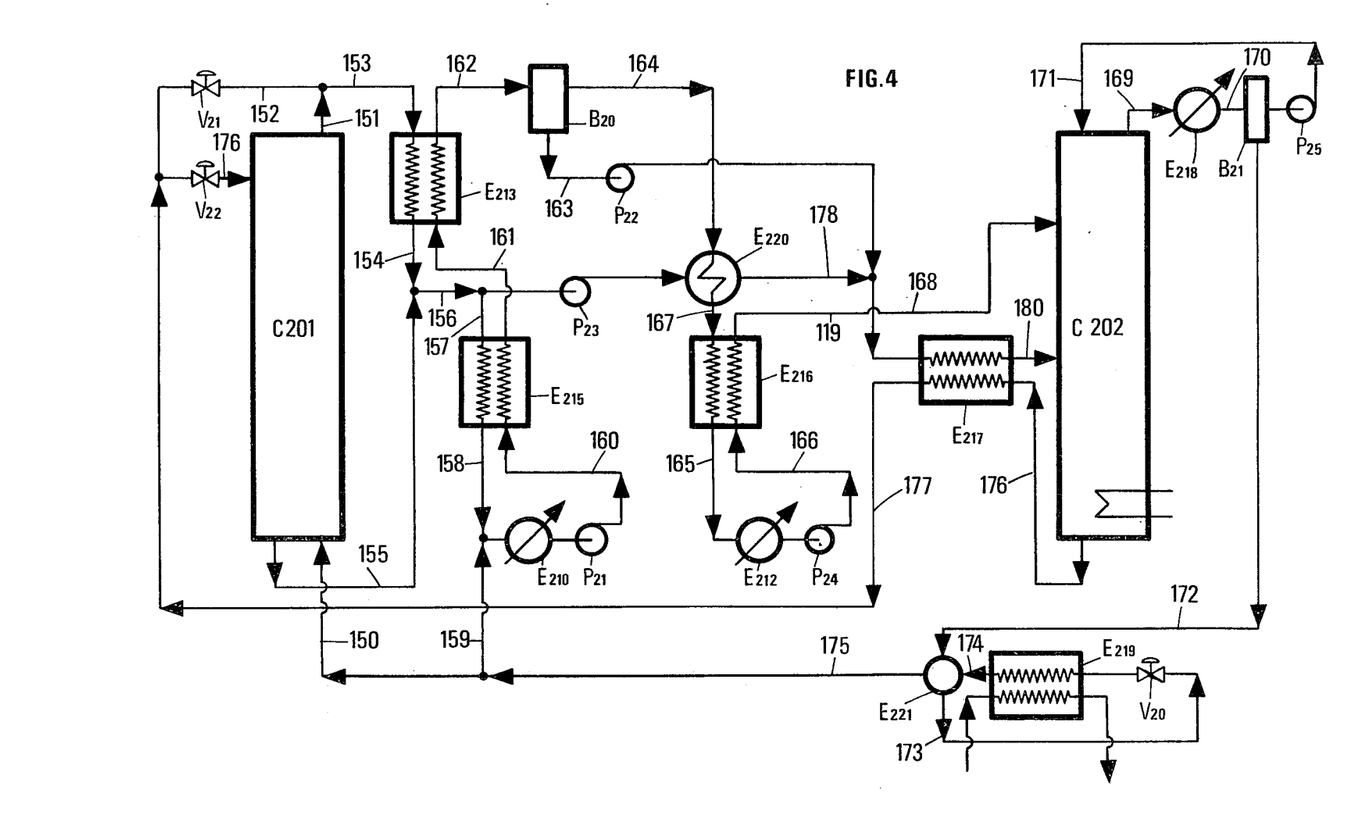
FIG. 4 is a schematic diagram of a fourth embodiment of the invention of FIG. 3.

The scheme of the FIG. 1B illustrates these main steps and a number of preferred additional steps; it is intended that the invention covers various other embodiments not represented in FIG. 1B. The FIGS. 2, 3 and 4 represent other embodiments of the invention.

The refrigeration fluid is vaporized in the exchanger $F_1$ (FIG. 1B) while cold is produced. A first fraction of the resultant vapor phase (line 10) is admixed with the lean solution (line 11) and absorbed partially or substantially totally in the enclosure $A_1$ while releasing heat in a temperature range $I_1$. A solution $S_1$ (line 13) and optionally a residual gas phase are collected. A second fraction of the vapor phase (line 12) is admixed with a part of the solution $S_1$. The resultant liquid-vapor mixture (line 14) is cooled with an external fluid and condensed in a temperature range $I_2$ in the exchanger $C_2$ with absorption of the refrigeration fluid in the solvent phase while forming a solution $S_2$ having a refrigeration fluid concentration higher than the concentration of the solution $S_1$. The temperature range $I_2$ is at least partly below the temperature range $I_1$. The solution $S_2$ is taken from the pump $P_2$ and fed through the line 15 to the enclosure $A_1$ where it is partly vaporized at a pressure close to the pressure in the desorption zone while recovering heat released by absorption in the enclosure $A_1$. The liquid-vapor mixture is then fed through the duct 16 to the distillitation column $D_1$, at an intermediate level thereof. Reboiling is effected at the bottom of the distillation column $D_1$ operated by counter-current contact of the desorbed vapor phase with the liquid phase to be desorbed, to effect the desorption, and heat is delivered by an external fluid. An impoverished solution is obtained at the bottom of the column $D_1$; it is fed through the line 17 to the exchanger $E_2$, expanded in the valve $V_3$ and recycled to the enclosure $A_1$ through the line 11. The fraction of the solution $S_1$ which is not fed to the condensor $C_2$ is passed through the duct 18, the pump $P_3$ and the exchanger $E_2$ and is introduced through line 19 into the distillation column $D_1$ at an intermediate level thereof, located below the introduction level of the duct 16. A vapor of high refrigeration fluid (the solute) content is collected in the duct 20 from the top of the column $D_1$; it is condensed in the exchanger $C_1$ by cooling with an external fluid. A fraction of the liquid phase thus obtained is fed back as reflux through the line 21 to the column $D_1$. The other fraction (line 22) expands in the valve $V_4$ and is vaporized in the exchanger $F_1$ while producing cold.

The refrigeration fluid operates in the absorption step as a solute, so that any one of these terms will be used in the following disclosure. It is not always necessary to separate the vapor discharged from the exchanger $F_1$ into two fractions and it is also possible to send the whole vapor into the enclosure $A_1$ and to remove a liquid/vapor mixture from the enclosure $A_1$. In that case, at the outlet of the enclosure $A_1$, a part of the liquid phase may be fed through the pump $P_3$ to the desorption step (e) and the remaining liquid-vapor mixture is condensed in the exchanger $C_2$ with absorption of the refrigeration fluid in the solvent phase.

The two successive absorption steps, which lead respectively to the formation of the solutions $S_1$ and $S_2$ are normally effected in different temperature intervals and at close pressure levels, the variations of pressure in the course of these two successive steps being attributable only to the pressure drops. However, when cold is required at different temperature levels, it is possible to vaporize the refrigeration fluid forming the solute in two exchangers operated at different pressure levels and to use the two vapor fractions thus obtained to form the solutions $S_1$ and $S_2$ respectively, the two absorption steps leading to the formation of the respective solutions $S_1$ and $S_2$ being then effected at different pressure levels.

It is not always advantageous to vaporize partially the totality of the solution $S_2$. In certain cases, it is preferable to send a liquid fraction of the solution $S_2$ to the distillation zone to increase the feed rate of the liquid phase in the rectification zone and thus reduce the rate of the liquid reflux to be fed back to the top of the distillation zone, the remainder of the solution $S_2$ being partially vaporized while recovering the heat delivered in the course of the absorption effected in the enclosure $A_1$.

For a given refrigeration power, the amount of heat delivered to effect the desorption step is the more reduced as the amount of heat exchanged in the course of the first absorption step, which is recovered, is more important as compared to the heat amount delivered in the course of the second absorption step and which is transmitted to an external fluid.

The amount of heat delivered in the second absorption step cannot be negligible since it is necessary to produce a sufficient feed rate of the solution $S_2$ to allow, by vaporization of the solution $S_2$, the recovery of the heat delivered in the course of the first step, but it is the lower with respect to the amount of heat delivered in the course of the first step as the fraction of the solution $S_2$ vaporized after exchange is the larger.

This object is attained by an essential feature of the invention: the first absorption step is effected in a temperature range $I_1$ located over the temperature range $I_2$. It is advantageous that the temperature range $I_1$ be the highest possible in order to vaporize an important fraction of the solution $S_2$. This supposes that the first absorption step is effected while maintaining relatively low concentrations of the solute. In particular, it is necessary that the purified solution obtained in the desorption step which is recycled to the first absorption step have so low a concentration of solute as possible. For that reason, there is used in the desorption step a zone of counter-current contact of the solution with the vapor phase generated by supply of external heat, so as to obtain a highly purified solution. The principle of such a contact of a vapor phase with a liquid phase is not new, but it was mainly used, up to now, to limit the stripping of solvent in the vapor phase, and it normally used only a very small number of plates in the case of a liquid vapor contact effected with plates, or a reduced contact length in the case of a liquid vapor contact effected with a packing. On the contrary, the process according to the invention necessitates a sufficiently thorough contact to obtain low solute concentrations in the purified solution, and it is preferably operated with solute concentrations in the purified solution lower than 5% by weight.

The second absorption step, which is effected in a temperature range $I_2$ lower than the temperature range $I_1$, leads to a solution $S_2$ of greater concentration than the solution $S_1$ and preferably containing at least 20% b.w. of solute, which allows partial vaporization of the solution at a pressure higher than the pressure in the first absorption step while recovering heat evolved in the course of the first step.

On the other hand, in order that the temperature at which the solution $S_2$ is brought after recovery of the heat evolved in the enclosure $A_1$ be as high as possible, it is advantageous to effect the first absorption step progressively, according to a temperature which decreases regularly and while effecting a counter-current heat exchange. It is also often advantageous to effect the first absorption step according to the arrangement shown in the French Patent No. 2,437,588 corresponding to copending U.S. application Ser. No. 079,730 filed Sept. 28, 1979.

Thus, when ammonia is the refrigeration fluid and water is the solvent, the ammonia vapor is contacted with a first fraction of lean ammonia solution, so as to obtain a more concentrated ammonia solution and a vapor of higher water content. The resulting vapor is admixed with a second fraction of lean ammonia solution and the resultant liquid vapor mixture is condensed in an exchanger with absorption of the refrigeration fluid in the solvent phase, while releasing heat. In that case, the heat recovery is effected in said exchanger.

Referring now to FIG. 1B, there is introduced into the column $D_1$ the fraction(s) of concentrated solution to be fractionated (for example that of the line 16) at intermediary levels thereof, and the resultant downflow liquid phase is counter-currently contacted with an upflow vapor phase, produced by reboiling of at least one part of the lean solution discharged from the bottom of the column and fed back to the column $D_1$ as vapor reflux.

The greater part of the stripped solvent can be eliminated from the vapor phase generated in the column $D_1$ by contacting this vapor phase in a rectification zone with a liquid reflux obtained by condensation of the vapor phase discharged from the said rectification zone. The condensate which is not fed back to the column $D_1$ as reflux is expanded in the valve $V_4$ and vaporized in the exchanger $F_1$.

This rectification is not always necessary and it is also possible, at the exit of the desorption zone, to condense and vaporize the mixture of solute and solvent discharged in vapor phase from the desorption zone. When the condensed mixture vaporizes only partly after expansion with cold production, the resultant liquid fraction may be re-mixed at least in part with the vapor discharged from the desorption zone, the resultant mixture being then subjected to the steps of condensation, expansion and vaporization. Such arrangements are known and described, for example, in the French Pat. No. 2,321,098 corresponding to U.S. Pat. No. 4,167,101 and the French Pat. No. 2,437,588 corresponding to copending U.S. application Ser. No. 079,730 filed Sept. 28, 1979, and French Pat. No. 2,444,242, corresponding to copending U.S. application Ser. No. 102,489 filed Dec. 11, 1979. As a rule, it is possible to apply to the different steps of the process all the arrangements of improvements known to one skilled in the art.

The pressure in the condenser $C_1$ and the column $D_1$ is the higher as the condensation temperature obtained by cooling with an external fluid is the higher. It is selected, for example, between 5 and 50 atm. The pressure in the evaporator $F_1$ and the condenser $C_2$ is lower. It is the lower as the temperature at which cold is produced in $F_1$ is the lower. It is selected, for example, between 0.1 and 5 atm.

When the difference of temperature in the evaporator $F_1$ and the condenser $C_2$ is important, which supposes an important difference between the pressures in the evaporator $F_1$ and the condenser $C_2$, the temperature of beginning vaporization of the solution $S_2$ at a pressure close to that of the condenser may become too high to allow recovery of the heat evolved in the enclosure $A_1$.

It has been found, and this is another object of the invention, that it is advantageous in that case to operate according to the arrangement of FIG. 2.

The refrigeration fluid is condensed in the condenser $C_3$, expanded through the valve $V_5$ and vaporized in the exchanger $F_2$ while producing cold. A first fraction of the resultant vapor phase (line 10) is admixed with the lean solution (line 11) and the resultant liquid-vapor mixture is condensed in the exchanger $E_3$ with absorption of the refrigeration fluid in the solvent phase, heat release in a temperature range $I_3$ and formation of a solution $S_3$. A second fraction of the vapor phase (line 12) is admixed with a part of the solution $S_3$. The resultant liquid-vapor mixture is cooled and condensed by means of an external fluid in a temperature range $I_4$ in the condenser $C_4$, while forming a solution $S_4$ whose concentration of refrigeration fluid is higher than the concentration of the solution $S_3$. The temperature range $I_4$ is at least partly below the temperature range $I_3$. The solution $S_4$ passes through the pump $P_4$ and its pressure is raised to a level intermediate between the pressure of the absorption zone and the pressure of the desorption zone; it is passed through the line 15 and the exchanger $E_3$ while recovering the heat evolved during the formation of the solution $S_3$ and is discharged (line 23) as a liquid-vapor mixture. The pressure at which the partial vaporization of the solution $S_4$ is lower than the pressure of the desorption zone, so that it is possible to vaporize a substantial portion of the solution $S_4$ under conditions which could not be obtained with the arrangement of FIG. 1a.

A fraction of the liquid phase (line 25) is separated in the drum 24 from the liquid-vapor mixture obtained by partial vaporization of the solution $S_4$, so as to obtain a liquid-vapor mixture (line 26) whose refrigeration fluid concentration is higher than the concentration of the solution $S_4$. The resultant liquid-vapor mixture is passed in the exchanger $E_4$ where it partially condenses; it is then condensed in the condenser $C_5$ with absorption of the refrigeration fluid in the solvent phase, by cooling with an external fluid, and forms a solution $S_5$. The solution $S_5$ is collected by the pump $P_5$ where it is brought to a pressure close to the pressure in the desorption zone; it passes through the line 27 into the exchanger $E_4$ and is discharged as a liquid-vapor mixture. The resultant liquid-vapor mixture is supplied through the duct 28 to the distillation column $D_2$ where the desorption takes place. The fraction of the solution $S_3$ which is not fed to the condenser $C_4$ may be admixed with the liquid fraction of the line 25. The resultant liquid mixture is collected and passed through the pump $P_6$, the exchanger $E_5$ and the line 29 into the distillation column $D_2$. A solution of decreased solute content is obtained at the bottom of the distillation column $D_2$. A portion of this solution is re-boiled by heating with an external fluid, so as to obtain a vapor phase which is fed to the distillation column $D_2$ as vapor reflux. The solution which has not been vaporized is supplied through the line 17 to the exchanger $E_5$; it is expanded through the valve $V_6$ and admixed with a fraction of the vapor recovered from the evaporator $F_2$.

The distillation column $D_2$ comprises, in its upper portion, a rectification zone where the vapor phase is contacted with a fraction of the liquid phase obtained by condensation of the vapor phase discharged through line 20 from said rectification zone and which is fed back through line 21 to the column $D_2$ as reflux.

The solution $S_5$, which is obtained by condensation with absorption of the refrigeration fluid in the solvent phase, at a pressure intermediate between the pressure in the absorption zone and the pressure in the desorption zone, has a refrigeration fluid concentration higher than the concentration of the solution $S_4$. This provides for a reduction of the reflux rate necessary in the distillation column $D_2$.

The proceedings of re-vaporization in two steps at different pressures of a part of the solution formed in the absorption step may be of course be operated in a higher number of steps.

As a matter of fact, it is possible to bring the solution $S_5$ to a pressure intermediate between the pressure at which the solution $S_3$ is partially vaporized and the pressure of the desorption zone, to separate at the exit of the exchanger $E_4$ a liquid phase fraction of the liquid-vapor mixture formed in the exchanger $E_4$, while obtaining a liquid-vapor mixture of higher ammonia content than the solution $S_5$, to condense the resultant liquid-vapor mixture with absorption of the refrigeration fluid in the solvent phase, while forming a solution $S_6$, and to supply the solution $S_6$ to the column $D_2$ by means of a pump. A part of the heat evolved during the condensation of the solution $S_6$, effected with absorption of the refrigeration fluid in the solvent phase, may be recovered by exchange with the solution when it is supplied to the column $D_2$.

The same proceedings may be repeated at will to obtain solutions of increasing concentrations.

When cold must be available at different levels of temperature, it is possible to vaporize the refrigeration fluid in several exchangers operated at different pressure levels and to absorb the different vapor fractions thus obtained in the absorption steps leading to the formation of the solutions $S_3$, $S_4$ and $S_5$ respectively, as well as in the additional absorption steps effected when the above proceedings are repeated.

In a first embodiment of the process, the main steps corresponding to the device of FIG. 1b are preferably as follows:
- (a') a first absorption step is operated by contacting a gas phase of solute with a liquid phase of solvent, heat is released in a first temperature interval $I_1$ and a solution $S_1$ is formed,
- (b') a second absorption step is operated in a second temperature interval $I_2$ lower than the temperature interval $I_1$ while releasing heat and forming a solution $S_2$,
- (c') heat evolved in step (a') is recovered by partially vaporizing the solution $S_2$,
- (d') the liquid-vapor mixture obtained in step (c') is supplied to a distillation zone, thereby obtaining a lean solute solution, which is recycled to step (a'), and a concentrated solute liquid phase,
- (e') the concentrated solute liquid phase obtained in step (d') is concentrated, and
- (f') it is vaporized to produce cold.

The step (c') may be effected by partial vaporization of only one fraction of the solution $S_2$, the other fraction being supplied in liquid phase to the distillation zone.

As indicated above, the absorption step (a') may be effected with any of the known modes of contact of the vapor phase forming the solute with the liquid phase forming the solvent, for example, the mode of contact disclosed in the French patent application EN No. 78 28 170, which consists of counter-currently contacting the vapor phase forming the solute with a part of the liquid phase forming the solvent, the other portion being admixed with the vapor phase discharged from the counter-current exchange zone.

The exchanger to be used for exchanging the heat evolved in the step (a') and recovered in the step (c') is preferably operated in conditions as close as possible to a counter-current exchange, so as to effect the largest possible heat recovery in the step (c').

When the vapor phase forming the solute and the liquid phase forming the solvent are admixed, this admixing may be effected by using various devices known in chemical engineering. It is thus possible to effect this admixing either on-line, in a static mixer, in a contact zone of the plate or packing type, or in a mechanically stirred vessel.

The admixing of the liquid and vapor fractions, on the one hand, and the supply of heat by at least partial condensation of the liquid-vapor mixture with absorption of the solute in the solvent phase on the other hand, may be operated either successively, the admixing zone being distinct from the exchanger where heat is transmitted to the exterior, or simultaneously, for example, by effecting this admixing in a vessel provided with cooling means.

According to a second preferred embodiment of the process, the main steps corresponding to the arrangement of FIG. 2 are the following:

(a'') a first absorption step is effected by contacting a gas phase of solute with a liquid phase of solvent, heat is evolved in a first temperature interval $I_3$ and a solution $S_3$ is formed, (b'') a second absorption step is effected in a second temperature interval $I_4$, heat is transmitted to an external fluid and a solution $S_4$ is formed, (c'') the heat released in the step (a'') is recovered by partially vaporizing the solution $S_4$ at a pressure intermediate between the pressure of the absorption step and the pressure of the desorption step, (d'') a liquid fraction is recovered from the resultant liquid-vapor mixture and a liquid-vapor mixture is obtained, which has a higher solute concentration than the solution $S_4$, (e'') the recovered liquid fraction is supplied to a distillation zone, (f'') the liquid-vapor mixture obtained in step (d'') is condensed by absorbing the solute in the solvent phase, obtaining a solution $S_5$ and producing heat which is at least partly transmitted to an external cooling fluid, (g'') the solution $S_5$ is at least partly vaporized while recovering a part of the heat released in the step (f'').

(h'') the liquid-vapor mixture formed in the step (g'') is supplied to the distillation zone, (i'') a solvent phase is recovered at the exit of the distillation zone and recycled to the step (a''), and a liquid phase is obtained, which constitutes the solute, (j'') the liquid phase constituting the solute is expanded and vaporized and cold is produced, and (k'') the gas phase obtained in the step (j'') is recycled to the step (a'').

It is clear from the above that the invention may be widely modified. For example, in the second embodiment, it is possible to partially vaporize the solution $S_5$ by at least partial recovery of the heat evolved in the step (a'') and/or to effect a partial vaporization of the solution $S_3$ by partial recovery of the heat from the step (f''). It is also possible to effect the step (d''), not by recovery of a liquid fraction, but by admixing a gas fraction obtained at a pressure close to the pressure at which the step (d'') is effected, so as to obtain a liquid-vapor mixture of higher solute content than the solution $S_4$, when the cold produced may be used at different temperature levels. In some cases, it is also possible to supply a fraction amounting to a part or the totality of the solution $S_5$ to the liquid phase distillation zone, without effecting a partial vaporization of the said fraction.

As indicated above, the proceedings leading to the formation of a solution $S_5$ of higher concentration than the solution $S_4$ may be repeated to obtain a solution $S_6$ of greater concentration than the solution $S_5$, and so on.

As in the first embodiment, the absorption step (a'') may use various known modes of content of the vapor phase forming the solute with the liquid phase forming the solvent, for example, the mode of contact disclosed in the above French patent application EN 7828170. The heat exchange effected in the said step (a'') must be preferably effected in conditions as close as possible to the countercurrent exchange mode. Any admixing step of a liquid with a vapor may be effected with the various devices known in chemical engineering, as shown in the disclosure of the first embodiment.

The invention particularly applies when the solute is ammonia and the solvent is water. However other solutes and solvents may also be used, either pure or as mixtures.

The solvent may also be an organic solvent such as dimethyl formamide, diethyl formamide, dimethyl sulfoxide, N-methyl pyrrolidone, tributyl phosphate, ethylene glycol, diethylene glycol, triethylene glycol dimethyl ether, tetraethylene glycol dimethyl ether, N,N-dimethylacetamide, isobutyl acetate, benzyl alcohol, amiline or a hydrocarbon selected, for example, from the paraffinic hydrocarbons.

The solute (whose boiling temperature is lower than that of the solvent), may be, in addition to ammonia, a hydrocarbon such as propane, butane, pentane or a halogenated hydrocarbon such as difluorochloromethane, fluorodichloromethane or difluorodichloromethane, provided it is soluble in the solvent, the dissolution taking place with heat evolution.

As a rule, any solute-solvent pair may be used, provided the materials are chemically stable in the conditions of temperature and pressure at which it is operated, the solute and the solvent may vaporize either pure or as mixture in the conditions of temperature and pressure at which the operation is performed, the solute being however more volatile than the solvent, and the solute dissolves in the solvent with heat evolution.

The process of the invention may be used to produce cold in the usual range of from $-60°$ C. to $+15°$ C. The refrigeration fluid constituting the solute is vaporized to produce cold at a pressure usually located in the pressure range of 0.1 to 10 atm. The description zone is usually operated at a pressure of 5 to 10 atm. The temperature at which heat is transmitted to an external fluid is usually in the range of $+10°$ to $+80°$ C.

Said heat is either transferred into the external cooling medium, water or air, or used as heating mode. The process then operates as a heat pump. It may be used in that case, for example, for heating buildings by recovering heat in the course of the vaporization of the refrigeration fluid constituting the solute (cold production step) from an external fluid (for example, water or air) which is cooled and releases heat, and the heat is thus pumped according to the process of the invention and supplied as useful heat.

The steps of the process may be effected with different devices known in chemical engineering.

For example, the distillation step, which is used to effect the desorption, may be effected in a plate or packing column and various types of plates or packings may be used.

Another embodiment of the invention, also given as example, is illustrated by FIG. 3.

The plate column C 101 is fed through the duct 110 with ammonia vapor whose purity is more than 99% The column C 101 has 12 plates and is operated at a top pressure of 3 kg/cm².

A vapor fraction formed of 37.5% b.w. ammonia and 62.5% b.w. water is recovered through the duct 111 from the top of the column C 101. This vapor fraction is admixed with an aqueous ammonia solution fed from the duct 112. The resultant liquid-vapor mixture is fed through the duct 113 to the exchanger E 101 where it condenses, the final condensation temperature being 75° C., and from where it is discharged in liquid phase through the duct 114. The resultant solution is admixed with a solution fed from the duct 115 and the mixture is supplied through the duct 116 to the exchanger E 102. At the exit of the exchanger E 102, the solution is collected in the duct 117 and admixed with ammonia vapor fed from the duct 118. The liquid-vapor mixture is supplied through the duct 119 to the condenser E 106 where it condenses by indirect contact cooling with an external fluid. The final condensation temperature is 25° C.; a solution containing 48% b.w. of ammonia is recovered through the duct 120 from the condenser E 106. This solution is collected in the drum B 10. It is then fed to the pump P 12, the duct 121 and the exchanger E 102 from where it is discharged through the duct 122 at a temperature of 52° C.

A portion thereof is supplied through the duct 123 to the plate column C 102 where it is introduced above the 5th plate from the top of the column. The remainder of the solution is fed through the duct 124 to the exchanger E 101 and is discharged through the pipe 125 at a temperature of 110° C. The liquid-vapor mixture which is collected in the duct 125 is fed above the 9th plate from the top of the column C 102.

The column C 102 has 20 plates and is operated at a top pressure of 10 kg/cm$^2$. From the top of the column C 102, there is recovered through the duct 126 ammonia vapor which condenses by cooling when counter-currently contacted with an external fluid in the condenser E 103 and is discharged in a fully condensed condition through the duct 127 at a temperature of 25° C. The condensate is recovered in the drum B 11. A portion of the condensate is fed back as reflux through the pump P 13 and the duct 128 to the column C 102. The remainder of the condensate is discharged through the duct 129, expanded in the valve $V_{10}$ and vaporized in the exchanger E 104 at a temperature of $-8°$ C. while producing a refrigeration power of 1,162 kw. The ammonia vapor is discharged from the exchanger E 104 through the duct 130.

At the bottom of the column C 102, heat is supplied (1,417 kw) and a purified solution containing 1% b.w. of ammonia is collected in the duct 131. This solution is fed into the exchanger E 105 from where it is discharged through the duct 132 at a temperature of 120° C. A portion of this solution is expanded in the valve $V_{11}$ and admixed with the vapor discharged from the top of the column C 101. The remainder of the stream fed through the duct 132 is expanded in the valve $V_{12}$ and fed to the column C 101. From the bottom of the column C 101, there is recovered through the duct 133 a solution containing 19% b.w. of ammonia. A portion of this solution is admixed with the solution discharged from the exchanger E 101. The remainder fraction is fed to the pump $P_{11}$, the exchanger E 105 and the duct 134. It is supplied to the column C 102 above the 12th plate from the top of the column.

Another mode of operation, also given as example, is illustrated in FIG. 4. The plate column C 201 is fed through the duct 150 with ammonia vapor of purity higher than 99%.

The plate column C 201 has 12 plates and the pressure is 4 kg/cm$^2$ at the top thereof. A vapor fraction containing 38% b.w. of ammonia and 62% b.w. of water is fed through the duct 151. This vapor fraction is admixed with a solution fed from the duct 152 and the liquid-vapor mixture is fed through the duct 153 to the exchanger E 213 from where it is discharged through the duct 154 in fully condensed conditions. The resultant solution is admixed with the solution recovered from the bottom of the column C 201 and which is supplied through the duct 155. The resultant mixture is discharged through the duct 156. A fraction is fed through the duct 157 to the exchanger E 215 and is discharged through the duct 158. The remainder fraction is fed through the pump $P_{23}$ to the exchanger E 220 from where it is discharged through the duct 178 at a temperature of 100° C. The liquid stream discharged through the duct 58 is admixed with ammonia vapor fed from the duct 159. The liquid-vapor mixture is fed to the condenser E 210 cooled with an external fluid, from which it is discharged in fully condensed condition at a temperature of 50° C. The ammonia concentration of the resultant solution is 39% b.w.

This solution is fed through the pump $P_{21}$ and the duct 160 to the exchanger E 215. It is discharged therefrom at 78° C. through the duct 161. It is then fed to the exchanger E 213 and flows through the duct 162 in a partially vaporized state at a pressure of 10 kg/cm$^2$ and a temperature of 120° C. The resultant liquid-vapor mixture is collected in the drum B 20 where the liquid phase settles. A liquid phase fraction is passed through the duct 163 and the pump $P_{22}$. It is admixed with the stream discharged from the exchanger E 220 through the duct 178 and the resultant stream is fed through the duct 179 to the exchanger E 217; it is discharged through the duct 180 and supplied to the plate column C 202 above the 8th plate from the top.

The liquid-vapor mixture which remains in the drum B 20, after discharge of the liquid stream through the duct 163, is collected in the duct 164 and fed to the exchanger E 220, the duct 167, the condenser E 216, the duct 165 and the exchanger E 212. In the condenser E 212 it fully condenses by cooling in indirect contact with an external fluid; it is discharged from the condenser E 212 in a fully condensed condition at a temperature of 50° C. A solution containing 59% b.w. of ammonia is thus obtained. This solution is fed through the pump $P_{24}$ and the duct 166 to the exchanger E 216; it is discharged in partially condensed condition through the duct 168. The liquid-vapor mixture is fed to the plate column C 202 above the 5th plate from the top of the column. The column C 202 has 17 plates and operates at a top pressure of 21 kg/cm$^2$. Ammonia vapor is discharged through the duct 169 from the top of the column C 202. This vapor is cooled in the condenser E 218 by indirect contact exchange with an external fluid and is discharged in a fully condensed state at a temperature of 50° C. through the duct 170. The condensate is collected in the drum B 21. At the exit of the drum B 21, a portion of the condensate is fed back as reflux to the column C 202 through the pump $P_{25}$ and the duct 171. A fraction of the condensate is discharged through the duct 172; it is supplied to the exchanger E 221 and discharged through the duct 173.

This condensate then expands in the valve $V_{20}$ and is fed to the exchanger E 219 where it vaporizes at a temperature of 0° C., while producing a refrigeration power of 1,162 kw which are used to cool an external fluid. The resultant vapor is fed through the duct 174 to the exchanger E 221; it is discharged through the duct 175.

Re-boiling is effected at the bottom of the column C 202; external heat means providing 1,696 kw.

The purified solution containing 1% b.w. of ammonia is discharged through the duct 176. It is fed to the exchanger E 217 and discharged through the duct 177 at a temperature of 115° C.; it is divided into two fractions: a portion expands in the valve $V_{21}$ and is admixed with the vapor discharged from the top of the column C 201; the remainder expands in the valve $V_{22}$ and is supplied through the duct 176 to the top of the column C 201.

What we claim:

1. A process for producing cold and/or heat, which comprises the following steps of:
   (a) contacting at least one part of a gas phase comprising a solute with one part of a liquid phase comprising a solvent, in a first absorption step for releasing heat in a first temperature range $I_1$ and recovering a solution $S_1$,
   (b) contacting at least a part of the solution $S_1$ with another part of the gas phase comprising a solute in at least one second absorption step, in the range $I_2$ lower than $I_1$, for transferring the liberated heat to an external fluid and recovering a solution $S_2$,
   (c) compressing the solution $S_2$, within a pressure range allowing partial vaporization of the solution $S_2$ resulting from a subsequent predetermined heating,
   (d) heating at least one part of the compressed solution $S_2$ to partially vaporize said compressed solution $S_2$ by applying at least one part of the heat released in the step (a) in the temperature range $I_1$, thereby partially vaporizing the solution $S_2$ for recovering a liquid-vapor mixture,
   (e) fractionating the liquid-vapor mixture obtained in step (d) in a counter-current contact desorption zone by contacting a portion of the liquid of the mixture with the vapor phase generated by heating another portion of the liquid with an external heat source, and separately recovering an enriched gas phase of solute and an impoverished liquid phase of solute,
   (f) condensing the gas phase of solute recovered in step (e) by transferring the condensation heat to an external fluid thereby recovering a condensate,
   (g) expanding the recovered condensate in at least one step and vaporizing at least a portion of resultant expanded condensate to produce cold, and transmitting said cold to an external fluid, thereby recovering at least one gas phase of solute and feeding at least one part thereof to the step (a), and
   (h) expanding the impoverished liquid phase of solute recovered in step (e) and feeding it back at least in part to the step (a) for being contacted again with at least one part of the gas from the step (g).

2. A process according to claim 1, wherein only one part of the gas phase of solute is contacted with the solvent, in the step (a), and the remainder of the gas phase of solute is fed to the step (b), as residual portion of solute, for being contacted with the solution $S_1$.

3. A process according to claim 1, wherein the whole of the gas phase of solute is fed to the step (a), a part of this gas phase is absorbed in the step (a), and at least one fraction of the gas phase constituting the residual portion of solute and at least one part of the solution from the step (a) are fed to the step (b).

4. A process according to claim 1, wherein only one part of the solution $S_1$ obtained in the step (a) is transferred to the step (b), the remainder is compressed and is transferred to the desorption zone of the step (e).

5. A process according to claim 1, wherein the solution $S_2$ is brought in the step (c) to a pressure intermediate between the pressure of the absorption zones (a) and (b) and the pressure of the desorption zone (step e).

6. A process according to claim 5, further comprising the following additional operations after step (d) and prior to step (e):
   (i) recovering a liquid fraction from the liquid-vapor mixture obtained in the step (d) and thereby recovering a liquid-vapor mixture of greater solute content,
   (j) feeding the liquid fraction thus recovered to the desorption zone of the step (e),
   (k) condensing the liquid-vapor mixture obtained in the step (i) by absorbing the vapor in the liquid, thus forming a solution ($S_5$), and transferring heat to an external cooling medium,
   (l) compressing further and vaporizing at least partially the solution $S_5$ by recovering a part of the heat released in the step (k), and
   (m) supplying the liquid-vapor mixture formed in the step (l) to the desorption zone.

7. A process according to claim 1, wherein the heat evolved in the first absorption step is transferred to the solution obtained in the second absorption step by indirect counter-current exchanger.

8. A process according to claim 1, wherein the solute concentration of the solution obtained in the second absorption step is at least 20% b.w.

9. A process according to claim 1, wherein the solute is ammonia and the solvent is water.

10. A process according to claim 1, wherein the solute is a hydrocarbon and the solvent is an organic solvent.

11. A process according to claim 1, wherein the solute is a halogenated hydrocarbon and the solvent is an organic solvent.

12. A process according to claim 1, wherein the pressure at which the desorption of step (e) is effected is between 5 atm. and 10 atm.

13. A process according to claim 1, wherein a fraction of the solution obtained in the second absorption step is directly fed to step (e).

14. A process according to claim 1, wherein the two absorption steps are effected at approximately the same pressure.

15. A process according to claim 1 wherein the contacting steps (a) and (b) are co-currently performed.

16. A process according to claim 1 wherein the impoverished liquid phase of solute resulting from the fractionating step has a solute concentration of less than 5% by weight.

17. A process according to claim 1 wherein a portion of the condensate recovered in step (f) is contacted with the enriched gas phase of solute recovered in step (e), before supplying said enriched gas phase to step (f).

18. A process according to claim 1 further comprising vaporizing only a fraction of the expanded condensate of step (g).

19. A process according to claim 1 comprising supplying only a portion of said liquid phase comprising the solvent to step (a) and admixing another portion thereof with said residual portion of solute gas phase supplied to step (b).

20. A process according to claim 1 wherein said cold produced by vaporizing the condensate in step (g) is transmitted to the external fluid in the temperature range $-60°$ C. to $+15°$ C.

21. A process according to claim 1 wherein the vaporizing of step (g) is effected at a pressure of 0.1 to 10 atm.

22. A process according to claim 1 wherein the heat transferred to the external fluids in steps (b) and (f) is transferred at a temperature from +10° C. to +80° C.

23. A process according to claim 1 wherein the expanding of the condensate in step (g) is effected in at least two decreasing levels of pressure, at least one first vapor phase of solute being recovered from the expansion at the first level of pressure and at least a second vapor phase of solute, distinct from the first-vapor phase, being recovered from the expansion at the second level of pressure, and said first and second vapor phases respectively supplied to the first and second absorption steps operated at distinct pressure levels.

24. In a process for producing cold and/or heat wherein at least one portion of a gas phase comprising a solute is contacted in a first absorption step with at least one portion of a liquid phase comprising a solvent for releasing heat in a first temperature range $I_1$, and recovering a solution $S_1$, at least a portion of the solution $S_1$ being then contacted in at least a second absorption step with a residual portion of the gas phase comprising the solute, in a second temperature range $I_2$ lower than $I_1$, for releasing the heat in the second temperature range $I_2$ to an external fluid and collecting a solution $S_2$, the solution $S_2$ being then sequentially compressed and heated to be partially vaporized for obtaining a liquid-vapor mixture which is fractionated in a counter-current contact desorption zone, thereby recovering an enriched gas phase of solute and an impoverished liquid phase of solute, condensing the gas phase of solute recovered by transferring the condensation heat to an external fluid to recover a condensate, expanding the recovered condensate in at least one step and vaporizing it to produce cold thereby recovering at least one gas phase of solute and feeding at least one part thereof to the first absorption step, and expanding the impoverished liquid phase of solute and feeding at least one part thereof to the first absorption step, the improvement which comprises:

compressing the solution $S_2$ in a pressure range to allow the partial vaporization of the solution $S_2$ resulting from the subsequent heating; and performing the heating of at least one portion of the compressed solution $S_2$ to partially vaporize said compressed solution $S_2$ by applying at least one portion of the heat released in the temperature range $I_1$ in the first absorption step to said compressed solution, thereby obtaining the liquid-vapor mixture.

* * * * *